United States Patent [19]
Udagawa

[11] Patent Number: 5,695,203
[45] Date of Patent: Dec. 9, 1997

[54] METAL GASKET WITH COATING LAYER

[75] Inventor: Tsunekazu Udagawa, Ichikawa, Japan

[73] Assignee: Ishikawa Gasket Co., Ltd., Tokyo, Japan

[21] Appl. No.: 723,544

[22] Filed: Sep. 30, 1996

[51] Int. Cl.$^6$ .................................................. F16J 15/06
[52] U.S. Cl. ............................ 277/235 B; 277/235 A
[58] Field of Search ........................... 277/235 A, 235 B, 277/207 R, 211, 213, 229

[56] References Cited

U.S. PATENT DOCUMENTS

| 4,834,399 | 5/1989 | Udagawa et al. | 277/235 B |
| 5,197,747 | 3/1993 | Ueda et al. | 277/235 B |
| 5,297,807 | 3/1994 | Udagawa | 277/235 B |
| 5,431,418 | 7/1995 | Hagiwara et al. | 277/235 B |

FOREIGN PATENT DOCUMENTS

| 4307178 | 10/1992 | Japan | 277/235 B |
| 5332454 | 12/1993 | Japan | 277/235 B |

*Primary Examiner*—Daniel G. DePumpo
*Attorney, Agent, or Firm*—Kanesaka & Takeuchi

[57] ABSTRACT

A metal gasket of the invention is used for an internal combustion engine, and is basically formed of a metal plate for constituting the gasket. The metal plate includes a hole and a bead around the hole for sealing therearound. A first coating layer is formed on at least a part of an upper surface of the metal plate except an upper portion of the bead. Thus, when the gasket is used, reduction of a surface pressure formed on the bead is prevented while fluid flowing through the hole is prevented by the bead and the first coating layer. The metal plate may be combined with one or more metal plates to constitute a metal laminate gasket.

3 Claims, 1 Drawing Sheet

METAL GASKET WITH COATING LAYER

BACKGROUND OF THE INVENTION AND RELATED ART STATEMENT

The present invention relates to a metal gasket for an internal combustion engine formed of a metal plate having a bead and a coating layer.

In a metal gasket or a metal laminate gasket, a bead is often formed on a metal plate around a hole to be sealed. When the gasket is installed between engine parts and is tightened therebetween, the bead around the hole is compressed to provide surface pressure around the hole to thereby securely seal around the hole.

Also, in a gasket, a coating layer is often interposed between metal plates to prevent fluid from flowing between the plates. Coating layers may be formed on both outer surfaces of the gasket contacting the engine parts to fill small scratches, such as cutter traces, formed on the engine parts.

The coating layer is helpful in a metal gasket or metal laminate gasket. However, a coating layer effective for fluid, such as cooling water or oil, is not so strong against heat.

Therefore, when a gasket is used for an engine generating high temperature, a coating layer is not formed on a metal plate, or a coating layer, which is strong against heat but not so effective for fluid, is used. When a coating layer, which is effective for fluid but not so strong against heat, is used near a high temperature portion, the coating layer on the metal plate may flow from the high temperature portion, so that the coating layer may be located slightly away from a cylinder bore, i.e. high temperature portion (U.S. Pat. No. 4,898,396).

In U.S. Pat. No. 5,297,807, a gasket is formed of three metal plates. A middle plate situated between two outer plates is provided with a bead for sealing around a cylinder bore and coating layers on both surfaces of the middle plate. In order to avoid heat from the cylinder bores, the coating layers are formed outside the bead.

In regard to sealing of a water hole in U.S. Pat. No. 5,297,807, the coating layers are formed on both surfaces of the middle plate, and beads formed on the outer plates surround the fluid hole and abut against the coating layers. The middle plate with the coating layers may have a bead and abut against one of the outer plates to seal around the fluid hole.

In the above situations, when the gasket is used for a long time, the coating layer on the bead or abutting against the bead wears or peels off to decrease surface pressure of the bead. Accordingly, fluid flowing through the fluid hole may leak through a weak surface pressure portion. The present invention has been made to obviate the above drawbacks.

One object of the invention is to provide a metal gasket having a bead and a coating layer, wherein a surface pressure of the bead does not decrease while using the coating layer.

Another object of the invention is to provide a metal gasket as stated above, which is protected from enlargement and contraction of a cylinder head by heat.

Further objects and advantages of the invention will be apparent from the following description of the invention.

SUMMARY OF THE INVENTION

A metal gasket of the invention is used for an internal combustion engine. The gasket is formed of one or a plurality of metal plates for constituting the gasket. In case the gasket is formed of one or first metal plate, the metal plate includes a hole and a bead formed around the hole for sealing around the same. The bead projects outwardly from an upper surface of the metal plate. A first coating layer is formed on at least a part of the upper surface of the metal plate except an upper portion of the bead. Therefore, even if the gasket is used for a long time, reduction of a surface pressure formed on the bead is substantially prevented while leakage of fluid flowing through the hole is prevented by the bead and the first coating layer formed on the upper surface of the metal plate.

In the invention, since the first coating layer is not formed on the upper portion of the bead, the surface pressure formed by the bead is not substantially reduced even if the gasket is used for a long time. In this respect, if the first coating layer is formed on the upper portion of the bead, the coating layer is strongly compressed by the bead. As a result, the coating layer may flow from the upper portion of the bead or wears thereat to thereby cause reduction of the surface pressure on the bead. In the invention, since the first coating layer is not formed on the bead, the surface pressure on the bead does not substantially decrease.

Also, when the engine is used, a cylinder head expands by heat, and when the engine is stopped, the cylinder head contracts again. Such expansion and contraction of the cylinder head are applied to the gasket to form stress on the gasket. Therefore, it is preferable that the gasket can at least partly slide relative to the cylinder head and cylinder block independently to absorb the stress applied to the gasket by the expansion and contraction of the cylinder head.

In the invention, since the bead where high surface pressure is applied does not have the coating layer, the bead can slide relative to the engine part or other plate abutting against the bead. Therefore, no stress is formed in the bead due to expansion and contraction of the cylinder head, and the bead is not damaged by heat.

In the invention, the first coating layer may have an annular shape portion outside the bead relative to the hole. Also, the first coating layer may include an inner portion situated between an edge of the hole and the bead. Further, a second coating layer may be formed on a lower surface of the metal plate including a concave portion of the bead.

When a metal laminate gasket is formed together with the above first metal plate, one or more metal plates may be laminated on or under the first metal plate. When a second metal plate with a curved portion and a flange is assembled with the first metal plate, the curved portion is located in the hole, and the flange is situated above the first metal plate. Coating layers may be formed on the flange, and under a base portion of the second metal plate.

DETAILED DESCRIPTION OF PREFERRED EMBODIMENTS

Figure 1:
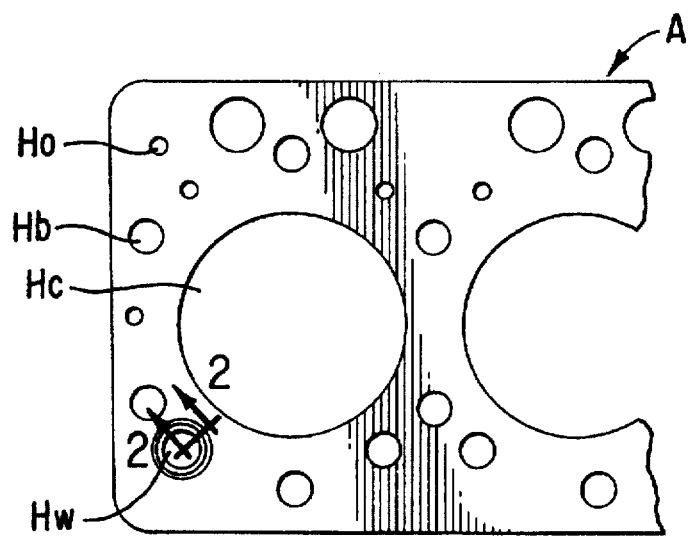
FIG. 1 is a plan view of a part of a first embodiment of a metal gasket of the present invention.
Figure 2:
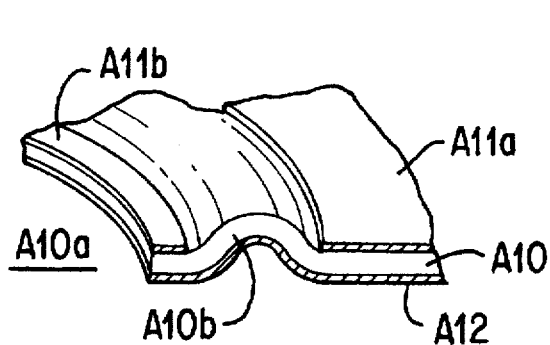
FIG. 2 is an enlarged perspective sectional view taken along line 2—2 in FIG. 1.

FIGS. 1 and 2 show a first embodiment A of a metal gasket of the invention. The gasket A is a cylinder head gasket and includes a cylinder bores Hc, water holes Hw, oil holes Ho, bolt holes Hb, and so on, as in a conventional gasket. In this embodiment, the invention is applied to a sealing structure around the water hole Hw. Any sealing mechanisms may be used for other holes.

The gasket A is formed of one metal plate A10, and includes a hole A10a for the water hole Hw and a bead A10b around the hole A10a. The bead A10b projects outwardly from an upper surface of the plate A10.

The gasket A also includes an upper main coating layer A11a, an upper inner coating layer A11b, and a lower coating layer A12. The upper main coating layer A11a is situated outside the bead A10b and extends substantially throughout the entire area of the plate A10. The upper inner coating layer A11b is situated between an edge of the hole A10a and the bead A10b. Therefore, a coating layer is not provided on an upper surface of the bead A10b, and the rest of the upper surface of the plate A10 is substantially covered by the coating layers A11a, A11b. The lower coating layer A12 extends substantially throughout the entire lower surface of the plate A10 including a lower portion of the bead A10b.

The coating layer may be formed of any kind of coating materials used in the gasket field. Preferably, coating material may be NBR, fluorine rubber or silicone rubber, which are suitable for sealing liquid but not so strong against heat.

When the gasket A is used, the gasket A is installed between a cylinder head and a cylinder block (both not shown) and is tightened. As a result, the bead A10b is compressed to seal around the water hole A10a. A cooling liquid passing through the water hole A10a is sealed by the bead A10b and the coating layers A11a, A11b, A12.

When the engine is actuated, the engine vibrates severely. Therefore, although the cylinder head and cylinder block are strongly tightened, the pressure applied to the gasket between the cylinder head and the cylinder block changes according to the vibration of the engine.

In case a coating layer is formed on an outer surface of a bead of a gasket, if the surface pressure on the bead is high and vibration of the engine is severe, the coating layer on the bead may flow, wear or peel off. As the coating layer on the bead flows, wears or peels off, the surface pressure on the bead is reduced. As a result of reduction of the surface pressure on the bead, fluid flowing through the hole may leak.

In the invention, since the coating layer is not formed on the upper surface of the bead A10b, even if the bead A10b vibrates severely, there is no flow, wear or peeling of the coating layer. Namely, the surface pressure of the bead A10b is not reduced due to coating problem on the bead.

Also, in the cylinder head gasket, the cylinder head expands due to heat when the engine is actuated, and contracts when the engine is cooled. Since heat expansion rate of the gasket is different from that of the cylinder head, preferably, the gasket slides relative to the cylinder head to absorb stress applied to the gasket.

In the present invention, since the coating layer is not formed on the bead, the bead or gasket can slide easily relative to the cylinder head. Therefore, no special stress is applied on the bead.

The gasket of the invention is especially useful for an engine providing high surface pressure and severe vibration.

Figure 3:
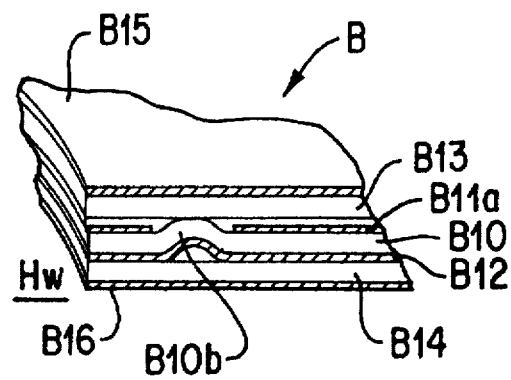
FIG. 3 is an enlarged perspective sectional view, similar to FIG. 2, of a second embodiment of the invention.

FIG. 3 shows a second embodiment B of a metal laminate gasket of the invention. The gasket B is formed of an upper plate B13, a lower plate B14 and a middle plate B10 situated between the upper and lower plates B13, B14. The middle plate B10 includes a bead B10b and is formed exactly the same as in the gasket A. The upper and lower plates B13, B14 extend substantially throughout the entire area of the gasket B. The upper plate B13 includes a coating layer B15 on an upper surface thereof, and the lower plate B14 includes a coating layer B16 on a lower surface thereof. The coating layers B15, B16 are made of the same material as in the coating layer A11a, A11b, A12.

The gasket B is used for an engine requiring a thick gasket. In the gasket B, even if high pressure is formed on the bead B10b, reduction of a surface pressure is generally avoided. Also, the plate B10 can slightly move or slide relative to the plate B13. The gasket B substantially operates as in the gasket A.

Figure 4:
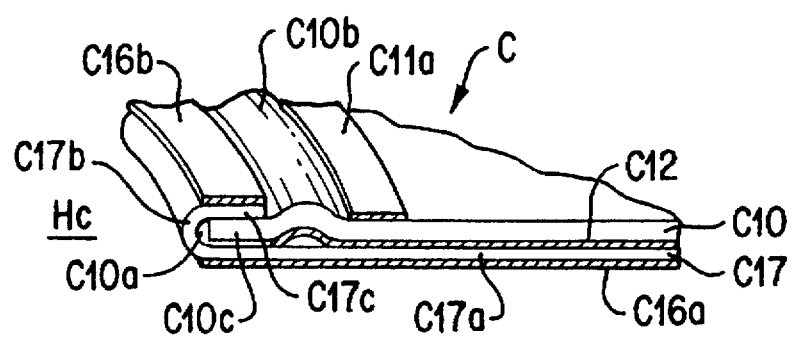
FIG. 4 is an enlarged perspective sectional view, similar to FIG. 2, of a third embodiment of the metal gasket of the invention.

FIG. 4 shows a third embodiment C of a metal laminate gasket of the invention, which is formed of an upper plate C10 and a lower plate C17. In the gasket C, a portion around a cylinder bore Hc is sealed according to the invention.

The upper plate C10 includes a bead C10b around a hole C10a for the cylinder bore Hc. A coating layer C11a in an annular shape is situated on an upper surface of the upper plate C10 outside the bead C10b, and a coating layer C12 is disposed under a lower surface of the upper plate C10. The coating layer C12 is located under the bead C10b, but it does not extend to an inner portion C10c around the hole C10a.

The lower plate C17 includes a main portion C17a located under the upper plate C10, a curved portion C17b for defining the cylinder bore Hc, and a flange C17c situated above the inner portion C10c. A coating layer C16a is provided under the main portion C17a, and a coating layer C16b is provided above the flange C17c. The coating layers C11a, C12, C16a, C16b are made of the same material as used in the gasket A.

In the gasket C, since the coating layer C12 is not formed under the inner portion C10c, reduction of the surface pressure around the cylinder bore is prevented for a thickness corresponding to the coating layer C12. The bead C10b provides surface pressure to seal around the cylinder bore Hc. Even if fluid passes over the bead C10b, the coating layer C11a seals the fluid thereat.

In the invention, a coating layer is not formed on the upper portion of the bead, at which high tightening pressure is formed. Therefore, even if the gasket is used for a long time, a surface pressure is not substantially reduced at the bead.

In the cylinder head gasket, many fluid holes are formed. All the fluid holes need not have the structure as defined in the invention. In the invention, the coating layer is not formed on the upper surface of the bead based on the condition and location of the bead, i.e. surface pressure, temperatures, and so on.

While the invention has been explained with reference to the specific embodiments of the invention, the explanation is illustrative and the invention is limited only by the appended claims.

What is claimed is:

1. A metal gasket for an internal combustion engine, comprising, a first metal plate for constituting the gasket, said first metal plate having a hole, an edge portion formed around the hole, a bead formed around the edge portion for sealing around the hole, said bead projecting outwardly from an upper surface of the first metal plate, and a base portion outside the bead relative to the hole, a first coating layer formed on the upper surface of the first meal plate at the base portion and the edge portion except the bead so that the upper surface of the first metal plate is substantially covered by the first coating layer except the bead, and a second coating layer formed on a substantial portion of a lower surface of the first metal plate including the edge portion, a concave portion of the bead and the base portion so that when the gasket is used, reduction of a surface pressure on the bead is substantially prevented while fluid flowing through the hole is prevented from permeating over the first metal plate by the first and second coatings and the bead.

2. A metal gasket according to claim 1, further comprising second and third metal plates disposed on both sides of the first metal plate to thereby constitute a metal laminate gasket.

3. A metal gasket for an internal combustion engine, comprising, a first metal plate for constituting the gasket, said first metal plate having a hole, an edge portion formed around the hole, a bead formed around the edge portion for sealing around the hole, said bead projecting outwardly from an upper surface of the first metal plate, and a base portion outside the bead relative to the hole, a second metal plate having a base portion situated under the first metal plate, a curved portion situated inside the hole of the first metal plate, and a flange situated above the edge portion of the first metal plate, a first coating layer having an annular shape formed on the upper surface of the first metal plate outside the bead relative to the hole without covering the bead so that when the gasket is used, reduction of a surface pressure on the bead is substantially prevented, a second coating layer formed under a lower surface of the first metal plate including a concave portion of the bead and the base portion except the edge portion, a third coating layer formed under the base portion of the second metal plate, and a fourth coating layer formed on an outer surface of the flange.

* * * * *